Sept. 21, 1971   C. A. HAAS   3,606,630
WINDSHIELD WIPER
Original Filed April 25, 1967

INVENTOR.
CHARLES A. HAAS
BY
Herbert Smith Sylvester
ATTORNEY

United States Patent Office 3,606,630
Patented Sept. 21, 1971

3,606,630
WINDSHIELD WIPER
Charles A. Haas, Dover-Chester Road,
Ironia, N.J. 07845
Continuation of application Ser. No. 633,572, Apr. 25, 1967. This application Sept. 15, 1969, Ser. No. 858,190
Int. Cl. A47l 1/00; B60s 1/02
U.S. Cl. 15—250.36  1 Claim

ABSTRACT OF THE DISCLOSURE

A windshield wiper in which the wiping surface is a solid fluorocarbon polymer is disclosed.

---

Figure 1:
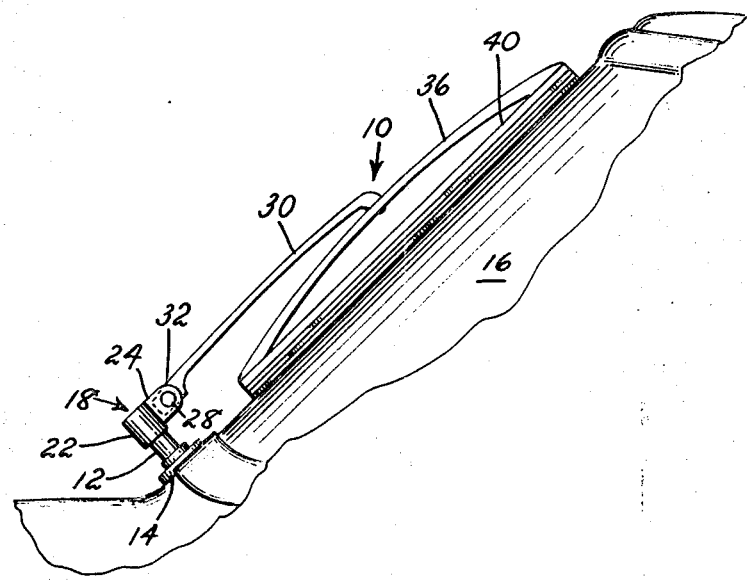

This invention relates to windshield wipers. More particularly it relates to windshield wipers formed of plastic material having a solid fluorocarbon polymeric wiping surface.

Windshield wipers presently in use generally utilize a rubber wiping blade. These wipers are generally fairly satisfactory, however they are frequently plagued by accumulation of contaminants such as dirt, water, ice, snow, and the like, which may cause scratching of windshields and freezing of the wipers. They also undergo degradation through deterioration caused by exposure to the atmosphere and sunlight.

The windshield wipers of the present invention are characterized by exhibiting the property of adherence, being non-sticking and non-wettable. They are substantially completely devoid of dirt, water, ice, snow and the like under all conditions. They are also substantially impervious to reaction with atmospheric elements and degradation by sunlight, and will not freeze in place when exposed to a freezing rain nor carry abrasive dirt which may scratch a windshield.

The windshield wipers of the present invention are additionally characterized by the virtual absence of frictional resistance between the blades and the windshield which they wipe, which manifests itself in markedly increased ease of operation of the windshield wiper, permitting the use of less powerful and less expensive drive motors.

In accordance with the present invention, the wiping edge of a windshield wiper comprises a solid fluorocarbon polymeric wiping member. The fluorocarbon may constitute an integument or outer lamina, or the entire body of the wiping blade or the entire wiping assembly may be an integral fluorocarbon unit.

The fluorocarbon materials which may be used in practicing the present invention are solid materials, and include a variety of solid polymers of tetrafluoroethylene. The molecular weight of the material employed will vary with its crystallinity, which in turn will depend in part on the processing techniques employed in preparing and processing the resin. In general, the less crystalline the final product, the greater its flexibility. Thus, the instant polymers, which contain a chain of carbon atoms including a plurality of (—$CF_2$—$CF_2$—) groups, may vary widely in molecular weight in the form in which they are used, ranging from a molecular weight of the order of about 2,000 or even lower to a molecular weight of 5 million or more, a molecular weight on the order of 3–4 million being preferred. The terminal groups at the end of the carbon chain may also vary, depending, as is well known, upon the method of making the polymer. (Polymers made in aqueous media are reported to have terminal carboxyl groups, while others may have hydrogen and/or chlorine atoms attached to the terminal carbon atoms of the chains.)

Other solid fluorocarbon polymers which may be employed include solid poly (polyfluorinated hydrocarbons) such as the copolymer of tetrafluoroethylene and hexafluoropropylene, solid polychlorotrifluoroethylene, and the like. All of these fluorocarbon polymers are characterized by being thermoplastic materials having extremely low coefficients of friction, i.e. as low as about 0.02 against itself and against glass (the sliding and static coefficients being the same), and suitable cold flow properties.

Although it is contemplated to practice the present invention with respect to the wiping blade only, in fact, with reference only to a thin integument thereon, e.g., a film which may be held in tension over a blade body preferably formed of resilient material such as rubber, the entire blade may be fabricated of the fluorocarbon polymer in a manner so as to permit attachment to conventional windshield wiper arm clips, or the entire windshield cleaning blade assembly and wiper arm may be molded as an integral unit entirely out of the fluorocarbon polymer.

The instant invention will be further described in conjunction with the accompanying drawings which are to be considered as exemplary of the invention and which do not constitute limitations thereof.

Figure 2:
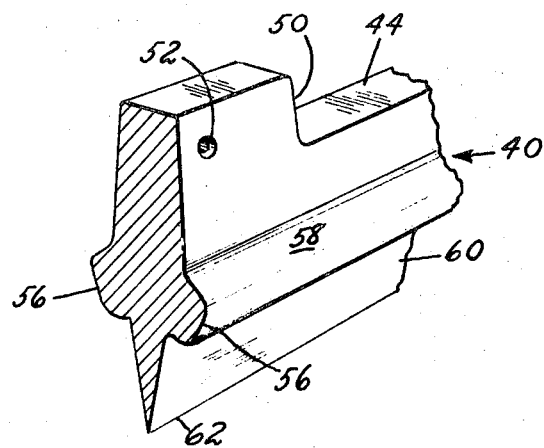

In the drawings:

FIG. 1 is a side elevational view of an automotive windshield wiping assembly of the present invention mounted upon an oscillatable pivot shaft in operative position; and FIG. 2 is an enlarged fragmentary perspective view of the central portion of a wiper element of the present invention adapted to be affixed to the usual windshield wiper arm presently employed in conventional windshield wiper structures.

In FIG. 1, a windshield wiping assembly of the present invention is indicated generally by reference numeral 10. This assembly is entirely molded as a single piece from solid tetrafluoroethylene polymer having a molecular weight of about 3½ million. The assembly 15 is shown attached to an oscillatable pivot shaft 12 mounted upon the cowl 14 of an automobile adjacent a windshield 16 to be wiped. Of course, as is well known in the art, the oscillatable pivot shaft 12 may be driven by any suitable means, such as by an electric motor or a vacuum operated motor.

An attachment bracket 18 is mounted on the oscillatable pivot shaft 12 by a socket-type cap 22 connected by splines to the pivot shaft 12 for oscillation therewith. The cap 22 is provided with a fixed radially projecting arm bracket 24 which receives a transverse pivot pin 28.

The free end 32 of a mounting arm 30 forming a part of the windshield wiper assembly 10 projects into the attachment bracket 18. The arm 30 is transversely apertured at its free end 32, to receive the pivot pin 28 therethrough. The pivot pin thus secures the pivot shaft bracket 18 and the arm 30 for oscillation around the axis of the pivot shaft 12. The pivot shaft bracket 18 and the arm 30 are preferably interconnected by a tension spring (not shown) as is well known in the art, the spring urging the arm 30 about the pivot pin 28 toward the windshield 16.

The arm 30 extends radially of the pivot shaft 12 and has its end 34 opposite the free end 32 secured to the bow element 36 of the wiper blade.

The longitudinal extremities of the bow 36 are joined to a longitudinally extending blade element 40. This blade element may be generally of the integral nature and cross-section of the principal length 44 of the blade illustrated in FIG. 2, the central lug 50 thereof being superfluous to the embodiment of FIG. 1.

The blade of FIG. 2 constitutes an integral unitary fluorocarbon polymeric member of uniform cross-section along its principal length 44, with an integral lug 50 positioned centrally along its length. The integral lug 50 is provided with a transverse aperture 52 to which the usual spring-urged windshield wiper arm may be pivotally attached.

The blade of FIG. 2 is provided with lateral projections 56 which serve to stiffen the midsection 58 of the blade, and the wiping lip 60 depends from the stiffened midsection 56, tapering to a thin flexible wiping edge 62.

What is claimed is:

1. A windshield wiper assembly comprising a longitudinally extending bow, a longitudinally extending blade, said blade being an integral, uniform, solid member of tetrafluoroethylene having a molecular weight of about 3½ million and containing terminal groups selected from the group consisting of carboxyl groups and hydrogen and chlorine atoms, the longitudinal extremities of said bow being jointed to the longitudinal extremities of said blade, said blade being unsupported between said longitudinal extremities, and a mounting arm secured to said bow and adapted for attachment to oscillating drive means of a vehicle.

References Cited

UNITED STATES PATENTS

| | | | |
|---|---|---|---|
| 2,754,796 | 7/1956 | Faulkner, Jr et al. | 118—44 |
| 2,874,674 | 2/1959 | Hornbostel | 118—113 |
| 2,908,028 | 10/1956 | Runton et al. | 15—245 |
| 3,030,916 | 4/1962 | Brown et al. | 118—252 |
| 3,131,414 | 5/1964 | Wise | 15—250.42 |

OTHER REFERENCES

Handbook of Material Trade Names; Zimmerman and Lavine; Industrial Research Services; 1953 edition; p. 558.

PETER FELDMAN, Primary Examiner

U.S. Cl. X.R.

260—92.1